(12) United States Patent
Walker et al.

(10) Patent No.: US 7,383,200 B1
(45) Date of Patent: Jun. 3, 2008

(54) METHOD AND APPARATUS FOR COLLECTING AND CATEGORIZING DATA AT A TERMINAL

(75) Inventors: Jay S. Walker, Ridgefield, CT (US); Andrew S. Van Luchene, Santa Fe, NM (US); Daniel E. Tedesco, Huntington, CT (US); John B. Dickerson, Norwalk, CT (US); Keith Bemer, Brooklyn, NY (US); Russell P. Sammon, Pacifica, CA (US); Andrew P. Golden, Yarmouthport, MA (US); Anna Rath, Hamden, CT (US); Magdalena Mik Fincham, Ridgefield, CT (US); Geoffrey M. Gelman, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 630 days.

(21) Appl. No.: 09/609,931

(22) Filed: Jun. 30, 2000

Related U.S. Application Data

(63) Continuation-in-part of application No. 09/335,644, filed on Jun. 18, 1999, now Pat. No. 6,317,723, which is a continuation-in-part of application No. 09/135,179, filed on Aug. 17, 1998, now Pat. No. 6,567,787, which is a continuation-in-part of application No. 08/841,791, filed on May 5, 1997, now Pat. No. 5,926,796.

(60) Provisional application No. 60/183,993, filed on Feb. 22, 2000, provisional application No. 60/175,723, filed on Jan. 12, 2000, provisional application No. 60/174,583, filed on Jan. 5, 2000.

(51) Int. Cl.
*G06F 17/30* (2006.01)
*G07G 1/00* (2006.01)

(52) U.S. Cl. .............................. 705/10; 705/7; 705/11
(58) Field of Classification Search .................... None
See application file for complete search history.

(56) References Cited

U.S. PATENT DOCUMENTS 3,890,461 A    6/1975   Vogelman et al.

(Continued)

FOREIGN PATENT DOCUMENTS

EP    0 991 03 A2    4/2000    ................... 17/60

(Continued)

OTHER PUBLICATIONS

Google Search Printout, "Re: Overcharging and inaccurate store pricing", 1/1997.*

(Continued)

*Primary Examiner*—Michael Cuff
*Assistant Examiner*—Christopher Buchanan
(74) *Attorney, Agent, or Firm*—Walker Digital Management, LLC

(57) ABSTRACT

A method and system for collecting and categorizing survey data includes receiving customer information from a customer. A query is identified based at least in part on the customer information. The query is output for presentation to the customer. In one embodiment, the query is presented to the customer by prompting an employee, such as a clerk at a point-of-sale terminal, to verbally present the question to the customer. A customer response to the query is then received. The request from the customer may be, e.g., a request to purchase one or more products or it may be a request for assistance or information. The customer response is then captured and analyzed.

44 Claims, 9 Drawing Sheets

U.S. PATENT DOCUMENTS

| | | | |
|---|---|---|---|
| 4,253,157 A | 2/1981 | Kirschner et al. | |
| 4,276,598 A | 6/1981 | Inoue et al. | |
| 4,482,976 A | 11/1984 | Ishikawa | |
| 4,484,217 A | 11/1984 | Block et al. | |
| 4,618,936 A | 10/1986 | Shiono | |
| 4,723,212 A | 2/1988 | Mindrum et al. | |
| 4,760,245 A | 7/1988 | Fukaya | |
| 4,833,609 A | 5/1989 | Grulke | |
| 4,910,672 A | 3/1990 | Off | |
| 4,947,028 A | 8/1990 | Gorog | 235/381 |
| 4,982,346 A | 1/1991 | Girouard et al. | 364/550 |
| 4,984,155 A | 1/1991 | Geier et al. | |
| 5,077,785 A | 12/1991 | Monson | 379/67 |
| 5,119,295 A | 6/1992 | Kapur | |
| 5,173,851 A | 12/1992 | Off et al. | |
| 5,235,415 A | 8/1993 | Bonicel et al. | |
| 5,235,509 A | 8/1993 | Mueller et al. | |
| 5,241,649 A | 8/1993 | Niyada | |
| 5,324,922 A | 6/1994 | Roberts | |
| 5,351,186 A | 9/1994 | Bullock et al. | 364/401 |
| 5,353,218 A * | 10/1994 | De Lapa et al. | 364/401 |
| 5,369,571 A | 11/1994 | Metts | 364/401 |
| 5,383,111 A | 1/1995 | Homma et al. | |
| 5,408,210 A | 4/1995 | Oka | |
| 5,413,341 A | 5/1995 | Lieberman | |
| 5,415,264 A | 5/1995 | Menoud | |
| 5,426,282 A | 6/1995 | Humble | |
| 5,428,606 A | 6/1995 | Moskowitz | |
| 5,482,139 A | 1/1996 | Rivalto | |
| 5,513,250 A | 4/1996 | McAllister | |
| 5,521,364 A | 5/1996 | Kimura et al. | |
| 5,528,490 A | 6/1996 | Hill | |
| 5,544,040 A | 8/1996 | Gerbaulet | |
| 5,597,312 A * | 1/1997 | Bloom et al. | 434/362 |
| 5,612,868 A | 3/1997 | Off et al. | |
| 5,619,558 A | 4/1997 | Jheeta | 379/90 |
| 5,630,103 A | 5/1997 | Smith et al. | |
| 5,679,001 A | 10/1997 | Russell et al. | |
| 5,694,546 A | 12/1997 | Reisman | |
| 5,698,834 A | 12/1997 | Worthington et al. | |
| 5,704,009 A | 12/1997 | Cline et al. | |
| 5,734,890 A | 3/1998 | Case et al. | 395/605 |
| 5,758,322 A * | 5/1998 | Rongley | 704/275 |
| 5,794,210 A | 8/1998 | Goldhaber et al. | |
| 5,818,909 A * | 10/1998 | Van Berkum et al. | 379/265.07 |
| 5,822,744 A * | 10/1998 | Kesel | 706/52 |
| 5,826,240 A * | 10/1998 | Brockman et al. | 705/11 |
| 5,832,457 A | 11/1998 | O'Brien et al. | |
| 5,839,104 A | 11/1998 | Miller et al. | 704/251 |
| 5,890,135 A * | 3/1999 | Powell | 705/14 |
| 5,893,075 A | 4/1999 | Plainfield et al. | 705/14 |
| 5,926,796 A * | 7/1999 | Walker et al. | 705/16 |
| 5,995,942 A * | 11/1999 | Smith et al. | 705/14 |
| 6,014,641 A | 1/2000 | Loeb et al. | |
| 6,021,390 A | 2/2000 | Satoh et al. | |
| 6,023,688 A * | 2/2000 | Ramachandran et al. | 705/44 |
| 6,052,668 A * | 4/2000 | Takeuchi | 705/16 |
| 6,055,514 A * | 4/2000 | Wren | 705/36 R |
| 6,070,155 A * | 5/2000 | Cherrington et al. | 705/400 |
| 6,078,891 A * | 6/2000 | Riordan et al. | 705/10 |
| 6,119,099 A * | 9/2000 | Walker et al. | 705/16 |
| 6,138,105 A * | 10/2000 | Walker et al. | 705/10 |
| 6,223,163 B1 * | 4/2001 | Van Luchene | 705/1 |
| 6,229,879 B1 | 5/2001 | Walker et al. | |
| 6,292,786 B1 * | 9/2001 | Deaton et al. | 705/14 |
| 6,317,716 B1 | 11/2001 | Braida et al. | |
| 6,456,981 B1* | 9/2002 | Dejaeger et al. | 705/14 |
| 6,490,567 B1 * | 12/2002 | Gregory | 705/39 |
| 6,567,787 B1 * | 5/2003 | Walker et al. | 705/16 |
| 6,651,045 B1 * | 11/2003 | Macaulay | 706/11 |
| 6,970,810 B1 * | 11/2005 | Matsko | 702/187 |
| 2002/0019737 A1* | 2/2002 | Stuart et al. | 704/275 |

FOREIGN PATENT DOCUMENTS

| | | |
|---|---|---|
| FR | 2757656 A1 | 6/1998 |
| JP | 2143393 A | 1/1990 |
| JP | 06-20161 | 2/1994 |
| JP | 06150164 | 5/1994 |
| JP | 07037170 | 2/1995 |

OTHER PUBLICATIONS

Wyard, P.J., et al; Spoken Language Systems—Beyond Prompt and Response; BT Technology Journal; vol. 14, No. 1; Jan. 14, 1996.*

Cramp, Beverly, "Resurgent research; growth of market research firms; A marketing Supplement." Marketing, p. III; ISSN: 0025-3650 Apr. 28, 1994.

"Speech Recognition Technology." Nuance, http://www.nuance.com, download date Dec. 27, 1999.

"Welcome to @pos.com" download dates, Oct. 26, 1999, Nov. 1, 1999, and Mar. 14, 2000.

Barry, Curt, "Software Review: Mail Order Manager; Management Software for Business", Catalog Age, Apr. 1994, p. 95, 3pp.

Shaffer, Richard A. "Computers With Ears", Forbes Magazine, Sep. 12, 1994, p. 238, 2pp.

Rabb David M., "Package Aids Catalog Management", DM News, Apr. 22, 1996, p. 14, 2pp.

"Geocapital Partners Invests in Hospitality Systems Inc.", Business Wire, Feb. 26, 1997, 2pp.

"Fujitsu—The G390 Cash Register", Fujitsu General Australia Pty Ltd—The G390 . . . , Mar. 24, 1998, 2pp. (http://www.fujitsugeneral.com.au/products/cashreg/g930.html).

"Clarify Introduces Advanced Scripting Module With Latest Release of Clear Call Center: New Script Manager Application Helps Call Centers Increase Revenue and . . . ", PR Newswire, Jun. 16, 1998, 3pp.

"Quick Cash Sale", Winward-Quick Cash Sale, (http://www.windward-sofware.com/tutorial/n-ms002.html), Downloaded: Jul. 22, 1998, 3pp.

Calem, Robert E., "Coming to a Cash Register Near You," New York Times, Sec. 3, Col. 1, p. F7(N,L), Jul. 31, 1994, 2pp.

Myhre, James W., "Examiner's Affidavit", dated Feb. 22, 2001 1pg.

Howland, Jennifer "National Distributers: Scanning the future", The Magazine for Magazine Management, Feb. 1985, 11 pp.

Wood, Wally, "What's constant in circulation marketing?" The Magazine for Magazine Management, Jun. 1985, 10 pp.

Love, Barbara, "Selling subscriptions at newstands", The Magazine for Magazine Management, Jun. 1, 1984, 2 pp.

Joyce, Walter, "Muscular merchandising", The Magazine for Magazine Management, Jun. 1986, 5 pp.

Reese, Diane "Revitalizing single-copy sales", The Magazine for Magazine Management, Feb. 1986, 11 pp.

Phoenix Papers to Sell Merchandise to Build Awareness, Editor & Publisher, Sep. 17, 1988, 2 pp.

Donaton, Scott, "Gift subscriptions find retail niche", Advertising Age, Jul. 16, 1990, 2 pp.

Guy, Pat "A gift off the rack: Mag subscription", USA Today, Dec. 19, 1990, 2 pp.

Jaben, Jan, "Magazine gift-giving made simple at retail outlets", Time Inc., Feb. 15, 1991, 3 pp.

Horton, Liz, "Holiday gift subs up, some due to novel promotions", The Magazine for Magazine Management, Feb. 1, 1992, 2 pp.

Carlson, Lynn, "Decreasing your direct-mail costs", The Magazine for Magazine Management, Sep. 1992, 2 pp.

Hochwald, Lambeth, "Sub sources that break with tradition", The Magazine for Magazine Management, 4 pp.

The Super Subs, Precision Marketing, a Thomson Corporation Company, Oct. 24, 1994, 5 pp.

Love, Barbara, "Get realistic about ratebase guarantees", The Magazine for Magazine Management, Jan. 1995, 3 pp.

Kelly, Keith J., "Getting the 'word' on the net", Advertising Age, Jan. 30, 1995, 2 pp.

Cyr, Diane, "Distribution Woes; declining newsstand circulation; includes related article on preventing newsstand fraud", The Magazine for Magazine Management, Jan. 1995, 5 pp.

Schnuer, Jenna, Overnight options add to distribution mix; distribution of 'Inside Sports' magazine, The Magazine for Magazine Management, Mar. 1, 1995, 2 pp.

Kelly, Keith J. "Publishers Pine for cyber-profits", Advertising Age, Mar. 13, 1995, 2 pp.

Hearst Corporation Launches 'The Multimedia Newsstand', vol. 12, Issue 2, Mar./Apr. 1995, 3 pp.

Wilson, Steve, "Out of print—but not business; magazines move away from print in favor of electronic publishing", The Magazine for Magazine Management, May 1, 1995, 2 pp.

Hochwald, Lambeth, "Postal blues: circulators cope with the rate crunch", The Magazine for Magazine Management, May 1, 1995, 3 pp.

Graham, Anne, "Nonmember subs—or not? Nonmember subscriptions to association magazines; includes tips from publishers", The Magazine for Magazine Management, Jun. 1, 1995, 4 pp.

Miller, Paul, "Magazine deal lacks catalog appeal", The Magazine for Magazine Management, Jun. 15, 1995, 2 pp.

Wilson, Steve, "Directory assistance: a buyer's guide can give you a big boost in revenue and attract new advertisers and subscribers", The Magazine for Magazine Management, Oct. 1, 1995, 6 pp.

Garratt, David, "What premium on on-cover premiums?", The Magazine for Magazine Management, Oct. 1, 1995, 3 pp.

HFS Incorporated and Hachette Fillipacchi Magazones: announce launch of Century 21 House & Home Magazine, Buiness Wire, Nov. 20, 1995, 2 pp.

Hochwald, Lambeth, "Circulation secrets: nine steps to a successful circulation launch strategy includes list of resources", The Magazine for Magazine Management, Feb. 1, 1996, 5 pp.

Kerwin, Ann Marie, "Notably at the newsstand: InStyle, Financial World push for greater single-copy sales", Inside Media, Feb. 7, 1996, 2 pp.

Adams, Mark, "Capell report sales drop at newsstands", Mediaweek, Mar. 11, 1996, 1 pg.

Hodges, Jane, 'WSJ' puts squeeze on Web subscriptions, Interact, Media & Marketing, Apr. 29, 1996, 2 pp.

Schnuer, Jenna, "A world without magazines? Consumers weigh in survey of consumers indicates that magazines are most dispensable form of communication for 37 percent of respondents", The Magazine for Magazine Management, Jun. 1, 1996, 2 pp.

Tedesco, Richard "Time Launches Net Subscription Service", Broadcast & Cable, Nov. 11, 1996, 2 pp.

Case, Tony, "The electronic newsstand branches out", The Magazine for Magazine Management, Apr. 1, 1997, 2 pp.

Krol, Carol "Magazine site to focus on commerce", Advertising Age, Aug. 18, 1997, 2 pp.

Magazine Subscription Sales Center, where buying subscriptions is easy, undated, 2 pp.

Tretorn Offiers Magazine Promo, Adweek, May 1, 1995, 1 pg.

LottoWorld, Mediaweek, May 8, 1995, 1 pg.

Manly, Lorne, A newsstand for the electronic age? The Magazine for Magazine Management, vol. 22, No. 16, Sep. 15, 1993, 3 pp.

* cited by examiner

| QUESTION IDENTIFIER 302 | QUESTION 304 | NUMBER OF TIMES ASKED 306 | NUMBER OF RESPONSES 308 | CONDITIONS 310 |
|---|---|---|---|---|
| Q12345 | "IS THERE ANYTHING WE COULD HAVE DONE TO MAKE YOUR SHOPPING EXPERIENCE MORE ENJOYABLE?" | 351 | 275 | INTRODUCTORY; EVERY 10 QUESTIONS |
| Q12346 | "WERE YOU ABLE TO FIND YOUR (PRODUCT) EASILY?" | 200 | 170 | (PRODUCT) |
| Q12347 | "DID YOU FIND EVERYTHING YOU WERE LOOKING FOR TODAY?" | 300 | 290 | INTRODUCTORY; EVERY 10 QUESTIONS |
| Q12348 | "HOW WAS YOUR SHOPPING EXPERIENCE TODAY?" | 320 | 175 | INTRODUCTORY; EVERY 10 QUESTIONS |
| Q12349 | "ARE YOU SATISFIED WITH OUR FREQUENT SHOPPER PROGRAM?" | 75 | 50 | FREQUENT SHOPPER |
| Q12350 | "ARE THERE FREQUENT SHOPPER BENEFITS THAT WE DON'T OFFER THAT YOU THINK WE SHOULD?" | 75 | 47 | FOLLOW UP TO Q12349 |
| Q12351 | "WERE YOU ABLE TO FIND YOUR (MANUFACTURER)-BRAND ITEMS TODAY?" | 80 | 60 | (MANUFACTURER) |
| Q12352 | "HOW OFTEN DO YOU BUY (PRODUCT)?" | 100 | 75 | (PRODUCT) |
| Q12353 | "HOW LONG DID YOU WAIT IN THE CHECKOUT LINE?" | 70 | 50 | FOLLOW UP; CHECKOUT COMPLAINT |
| Q12354 | ADDRESS (CUSTOMER) BY NAME AND THANK THEM FOR SHOPPING WITH US | 30 | 30 | INTRODUCTORY; EVERY 15 QUESTIONS |

FIG. 3

| EMPLOYEE IDENTIFIER 402 | EMPLOYEE NAME 404 | EMPLOYEE AUTHORITY LEVEL 406 | EMPLOYEE CONSTRUCTED QUESTION(S) 408 | EMPLOYEE ACCOUNT BALANCE 410 |
|---|---|---|---|---|
| 111-111-111 | JOE JOHNSON | LOW | --- | $0.00 |
| 111-111-123 | TINA TARATINO | HIGH | Q12352 | $15.00 |
| 222-111-111 | CINDY LU | MEDIUM | --- | 1 HOUR BREAK |
| 333-111-111 | LARRY LEISURE | MANAGER | Q12350, Q12354 | $17.50 |

| EMPLOYEE RESPONSE IDENTIFIER 502 | CONDITION(S) 504 | EMPLOYEE RESPONSE 506 |
|---|---|---|
| E0001 | POSITIVE TONE; TRAINEE | "THANK YOU FOR YOUR INPUT AND FOR SHOPPING AT (STORE NAME)." |
| E0002 | POSITIVE TONE; EXPERIENCED STAFF | THANK THE CUSTOMER. |
| E0003 | NEGATIVE TONE; (PRODUCT) COMPLAINT; MANAGER | APOLOGIZE TO THE CUSTOMER. OFFER A 50%-OFF COUPON FOR (PRODUCT). |
| E0004 | NEGATIVE TONE; STAFF COMPLAINT | APOLOGIZE TO THE CUSTOMER. |
| E0005 | VERY NEGATIVE TONE; FREQUENT SHOPPER; STAFF COMPLAINT; MANAGER | APOLOGIZE TO THE CUSTOMER. CREDIT FREQUENT SHOPPER ACCOUNT BASED ON MANAGER DISCRETION |
| E0006 | ANY TONE; PRODUCE SECTION; CLEAN-UP | THANK THE CUSTOMER FOR HIS/HER INPUT. ASK MANAGER TO DISPATCH EMPLOYEE TO CLEAN UP PRODUCE SECTION |
| E0007 | POSITIVE TONE; STAFF COMPLIMENT; TRAINEE | "THANK YOU FOR YOUR FEEDBACK." |
| E0008 | POSITIVE TONE; (PRODUCT) FEEDBACK | "THANK YOU FOR YOUR INPUT ON (PRODUCT). A 10%-OFF COUPON WILL PRINT OUT WITH YOUR RECEIPT." |

| RESPONSE IDENTIFIER 602 | QUESTION IDENTIFIER 604 | EMPLOYEE IDENTIFIER 606 | CUSTOMER IDENTIFIER 607 | RESPONSE 608 | CATEGORY 610 |
|---|---|---|---|---|---|
| R7777 | Q12345 | 111-111-111 | -- | YES, THE CHECKOUT LINES WERE TOO LONG. | STAFF; CHECKOUT |
| R7778 | Q12346 | 111-111-123 | -- | YES, THE DETERGENT WAS EASY TO FIND. | STORE LAYOUT; HOUSEHOLD PRODUCTS |
| R7779 | Q12347 | 333-111-111 | 222-222-222 | NO, I WAS UNABLE TO FIND THE CLEAN-BRAND LAUNDRY DETERGENT. | STORE LAYOUT; HOUSEHOLD PRODUCTS |
| R7780 | Q12345 | 333-111-111 | -- | EVERYTHING WAS VERY CONFUSING. I COULD NOT FIND THE PRODUCTS I WAS LOOKING FOR. | STORE LAYOUT |
| R7781 | Q12348 | 333-111-111 | 122-123-123 | JOHN, THE EMPLOYEE IN THE SHOE DEPARTMENT, WAS EXTREMELY RUDE TO ME. I WILL NEVER SHOP HERE AGAIN. | STAFF; SHOE DEPARTMENT |
| R7782 | Q12350 | | -- | NO, I GET MUCH BETTER BENEFITS IN YOUR COMPETITOR'S PROGRAM. | FREQUENT SHOPPER |
| R7783 | Q12352 | | -- | I BUY BIG-BRAND SOAP WEEKLY. | BIG-BRAND SOAP |
| R7783 | Q12348 | 333-123-123 | -- | TERRIBLE. THE PRODUCE SECTION IS A COMPLETE MESS. | PRODUCE; STAFF; CLEAN-UP |

FIG. 6A

| TONE 612 | DETAILS 614 | EMPLOYEE RESPONSE 616 |
|---|---|---|
| NEGATIVE | — | E0004 |
| POSITIVE | DETERGENT | — |
| NEGATIVE | CLEAN-BRAND DETERGENT | E0003 |
| NEGATIVE | — | E0004 |
| VERY NEGATIVE | EMPLOYEE IDENTIFIER 555-222-111 | E0005 |
| NEGATIVE | COMPETITION | E0004 |
| — | BIG-BRAND SOAP | E0008 |
| VERY NEGATIVE | PRODUCE | E0006 |

FIG. 6B

METHOD AND APPARATUS FOR COLLECTING AND CATEGORIZING DATA AT A TERMINAL

CROSS-REFERENCE TO RELATED APPLICATIONS

This application:

(i) is a continuation-in-part of co-pending U.S. patent application Ser. No. 09/135,179, filed Aug. 17, 1998, for "METHOD AND APPARATUS FOR DETERMINING WHETHER A VERBAL MESSAGE WAS SPOKEN DURING A TRANSACTION AT A POINT-OF-SALE TERMINAL," issued on May 20, 2003, as U.S. Pat. No. 6,567,787 B1, the content of which is incorporated by reference herein for all purposes;

(ii) is a continuation-in-part of co-pending U.S. patent application Ser. No. 09/335,644, filed Jun. 18, 1999, for "METHOD AND APPARATUS FOR SELLING SUBSCRIPTIONS TO PERIODICALS IN A RETAIL ENVIRONMENT." issued on Nov. 13, 2001, as U.S. Pat. No. 6,317,723 B1, which is a continuation of U.S. patent application Ser. No. 08/841,791, filed May 5, 1997, for "METHOD AND APPARATUS FOR SELLING SUBSCRIPTIONS TO PERIODICALS IN A RETAIL ENVIRONMENT," issued on Jul. 20, 1999, as U.S. Pat. No. 5,926,796 B1, the content of each of which is incorporated by reference herein for all purposes; and (iii) hereby claims priority from U.S. Provisional Application Ser. No. 60/175,723 filed Jan. 12, 2000, entitled "METHOD AND APPARATUS FOR COLLECTING AND CATEGORIZING DATA AT A POINT-OF-SALE (POS) TERMINAL," the entirety of which is incorporated herein by reference for all purposes.

This application is related to co-pending U.S. Patent Application Ser. No. 60/183,993, filed Feb. 22, 2000 for "SYSTEMS AND METHODS FOR DETERMINING A CUSTOMER-EMPLOYEE INTERACTION RULE", and U.S. Patent Application Ser. No. 60/174,583, filed Jan. 5, 2000 for "METHOD AND SYSTEM FOR MOTIVATING AN EMPLOYEE TO PERFORM A BEHAVIOR RELATING TO AN UPSELL," the content of each of which is incorporated by reference herein for all purposes.

FIELD OF THE INVENTION

The present invention relates to methods and apparatus for collecting information. More particularly, embodiments of the present invention relate to methods and apparatus for collecting and categorizing customer data.

BACKGROUND OF THE INVENTION

Many businesses solicit and gather information from their customers. This can help a business gain a better understanding of its customers and respond to their suggestions and complaints.

Businesses use a number of different techniques for collecting customer information. For example, many businesses provide comment cards and encourage customers to use them to provide feedback. Restaurants may place the cards on the table, encouraging customers to fill out a card during, or immediately after a meal. Retailers may place the cards at the point-of-sale and ask that customers fill out a card while the shopping experience is still fresh. These comment cards typically include a number of multiple choice questions or identify different service areas and ask the customer to rate the quality of service in each area.

Unfortunately, this approach to soliciting customer comments has a number of disadvantages. For example, customers generally dislike filling out and submitting comment cards because the process is relatively burdensome and because they often perceive such cards as being ineffective or ignored by the business. Often, customers only take the time to fill out and submit comment cards when they have something to complain about. This is unfortunate, as many businesses would like to hear helpful suggestions or positive comments as well.

Many businesses solicit customer feedback through the use of customer service desks. Customers are encouraged to raise complaints or suggestions with customer service representatives that staff the customer service desk. Unfortunately, these customer service desks are generally not ideal for soliciting customer feedback. A customer who would like to point out a problem in service or otherwise make a complaint or suggestion must initiate contact with the customer service desk. This can be inefficient or burdensome for the customer. Many customer service desks can have long lines, especially during heavy shopping periods. As a result, a customer with a minor suggestion or complaint may be discouraged from providing feedback because the process is too burdensome. Further, many customers are reluctant to complain because they want to avoid confrontation or being perceived as frequent complainers.

Businesses also generate customer comments through the use of market research and focus groups. These methods can be very useful in soliciting comments about the likes and dislikes of customers in a group. However, the comments received may not be from actual customers of the business. Further, the comments received are not necessarily immediate and personal comments regarding the business or a customer's most recent experiences with the business.

It would be advantageous to provide a method and apparatus that overcame the drawbacks of these methods and systems for soliciting and collecting customer feedback.

SUMMARY OF THE INVENTION

To alleviate the problems inherent in the prior art, and to improve the ability to collect and categorize customer data, embodiments of the present invention provide a system and method for collecting and categorizing survey data at terminal devices.

In one embodiment, a method and system for collecting and categorizing survey data includes receiving customer information. The customer information may include, e.g., transaction information about the purchase of one or more products. In some embodiments, the customer information includes purchase transaction information generated at the point of purchase. As a specific example where a customer is purchasing groceries at a grocery store, the customer information may consist of product information about the products the customer is purchasing. The customer information may also include information identifying the customer, or information about a customer inquiry, such as a request for assistance or information. The customer information may also include information specifically solicited by, for example, a store employee.

Once customer information is received, a query is identified based at least in part on the customer information. For example, if the customer information includes transaction information received at a point of purchase, the query may be selected based at least in part on the transaction information (e.g., a customer purchasing a box of detergent may be asked a query related to the detergent, a customer making purchases during a high traffic period may be asked a query regarding the amount of time the customer waited in line, etc.). Once identified, the query is output for presentation to the customer. In one embodiment, the query is presented to the customer by prompting an employee, such as a clerk at a point-of-sale terminal, to verbally present the question to the customer. A customer response to the query is then received, captured and analyzed. In one embodiment, the customer response is a verbal response and the response is recorded and processed using a speech recognition program to generate one or more files representing the customer's response. The file(s) may then be analyzed, e.g., by categorizing the customer's response into one or more categories which have been established by a merchant or other entity collecting the survey data.

In some embodiments, the merchant may perform some remediation to directly address a customer's response. Various acts may be taken to react to a customer's response, including, for example, thanking the customer for his input, dispatching an employee to correct a problem, offering the customer a benefit (e.g., in the form of a coupon or discount), or the like. For example, a customer response which raises a complaint about service may elicit a direct remediation response in the form of an apology and a coupon. A customer response noting a dangerous defect (e.g., a potential slip and fall hazard caused by spilled merchandise in a grocery store) may prompt the immediate dispatch of an employee to correct the defect. In other embodiments, remediation may be an indirect response to a customer response. For example, a merchant may decide to modify the store layout only after receipt of many customer complaints about the current store layout.

In some embodiments, more than one query is identified and presented to the customer for response. For example, each subsequent query may be identified based on customer responses from previous queries. In this manner, embodiments of the present invention enable a merchant to elicit detailed feedback from customers. The use of multiple queries which are selected based at least in part on customer responses allows the selection and presentation of survey questions in a conversational and friendly manner which increases the likelihood of soliciting useful survey data.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 3 is a table illustrating an exemplary data structure of a survey question database for use in the present invention;

FIG. 4 is a table illustrating an exemplary data structure of an employee database for use in the present invention;

FIG. 5 is a table illustrating an exemplary data structure of an employee response database for use in the present invention;

FIGS. 6A and 6B show a table is a table illustrating an exemplary data structure of a response database for use in the present invention;

DETAILED DESCRIPTION OF THE INVENTION

Applicants have recognized that businesses have a need to collect and categorize customer feedback. Preferably, the collection of the feedback is performed in a manner which requires little effort on the part of the customer, is non-confrontational, allows the business to solicit feedback on particular topics, encourages the customer to provide helpful suggestions as well as complaints, and allows the customer to provide feedback during his or her interaction with the business. The term "customer", as used throughout this disclosure, is intended to refer to various types of consumers who interact with businesses. For example, a "customer" may be a individual purchasing goods at a merchant, returning goods to the merchant, seeking assistance from the merchant, etc. The term "merchant" or "business" is used to generally refer to vendors of goods or services who interact with customers. A "merchant" or "business" may be a retail store, a restaurant, a repair shop, a doctor's office, or the like.

Devices

Figure 1:
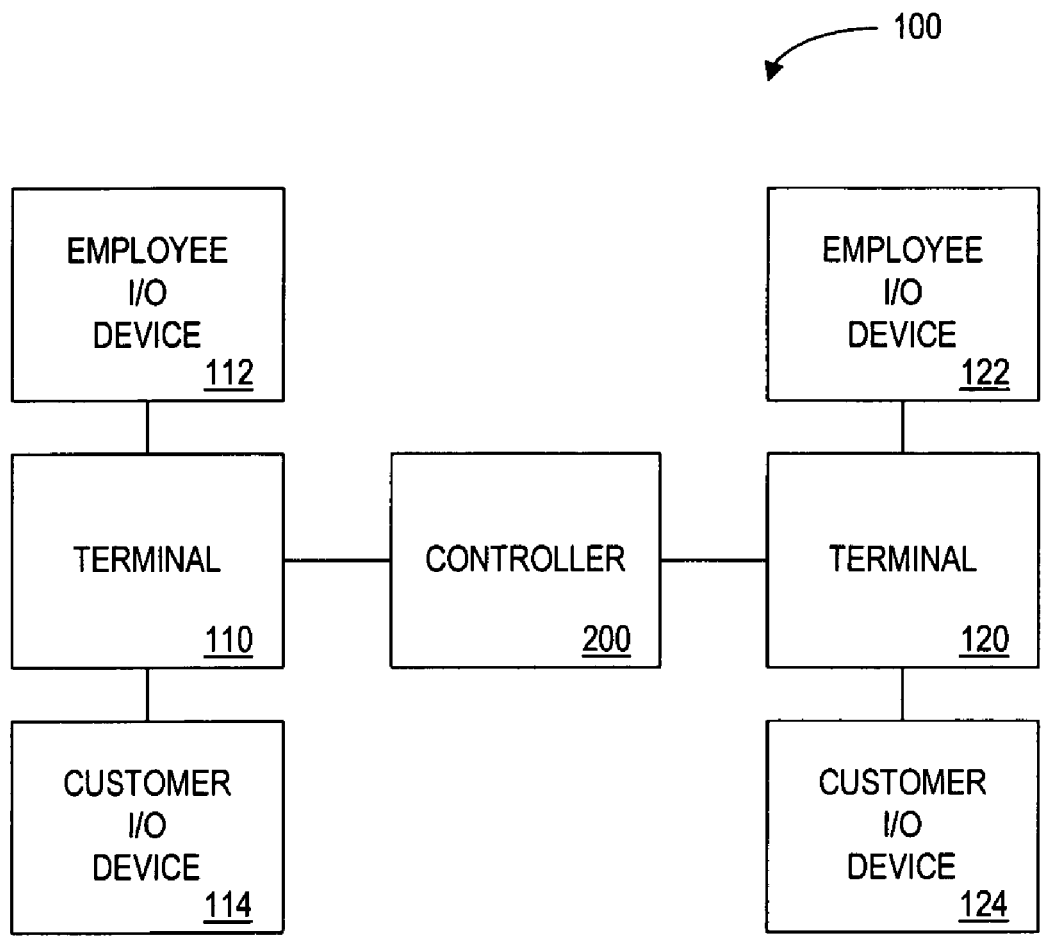
FIG. 1 is a block diagram of a system consistent with the present invention.

Referring now to FIG. 1, an apparatus 100 according to embodiments of the present invention includes a controller 200 that is in communication with one or more terminals 110 and 120. The controller 200 may communicate with the terminals 110 and 120 directly or via a network such as the Internet. Each of the terminals 110 and 120 may comprise computers, such as those based on the Intel® Pentium® processor, that are adapted to communicate with the controller 200. Any number of terminals 110, 120 may be in communication with the controller 200. In one embodiment, one or more of the terminals 110, 120 are point-of-sale terminals. In other embodiments, one or more of the terminals 110, 120 are portable or fixed customer service terminals. Each of the terminals 110, 120 has an employee input/output device 112, 122 and a customer input/output device 114, 124. For example, the employee input/output device 112, 122 may be a monitor, a keypad, a touchscreen, a microphone, a speaker, a headset, or the like. The customer input/output device 114, 124, in one embodiment, is a keypad, microphone, touchscreen, video recording device, or the like. In some embodiments, the employee input/output device 112, 122 and the customer input/output device 114, 124 are the same.

Communication between the terminals 110, 120 and the controller 200 may be direct or indirect, such as over the Internet through a Web site maintained by controller 200 on a remote server or over an on-line data network including commercial on-line service providers, bulletin board systems and the like. In yet other embodiments, the devices may communicate with controller 200 over radio-frequency (RF), cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 200 may function as a "Web server" that generates Web pages (documents on the Web that typically include an HTML file and associated graphics and script files) that may be accessed via the Web and allows communication with the controller 200 in a manner known in the art.

Any or all of the terminals 110, 120 may be, e.g., conventional personal computers, portable types of computers, such as a laptop computer, a hand-held computer, a Personal Digital Assistant (PDA), or a wired or wireless telephone. Any combination of terminals 110, 120 may be employed. For example, a retailer using techniques of the present invention may choose to deploy a number of different types of terminals 110, 120, including point-of-sale terminals at the store's checkout counters, PDAs operated by employees staffing different departments of the store, computerized kiosks located in the store, and personal computers at customer service desks throughout the store. In one embodiment, each of the terminals 110, 120 are in communication with a controller 200. In other embodiments, the terminals 110, 120 are in direct communication with each other without use of a controller 200. For example, a merchant location may have several point-of-sale terminals in a store network where each of the point-of-sale terminals are capable of independently performing the functions of the present invention. In still other embodiments, the terminals 110, 120 are stand-alone devices which individually operate to perform features of the present invention without interacting with other terminals or a controller.

Figure 2:
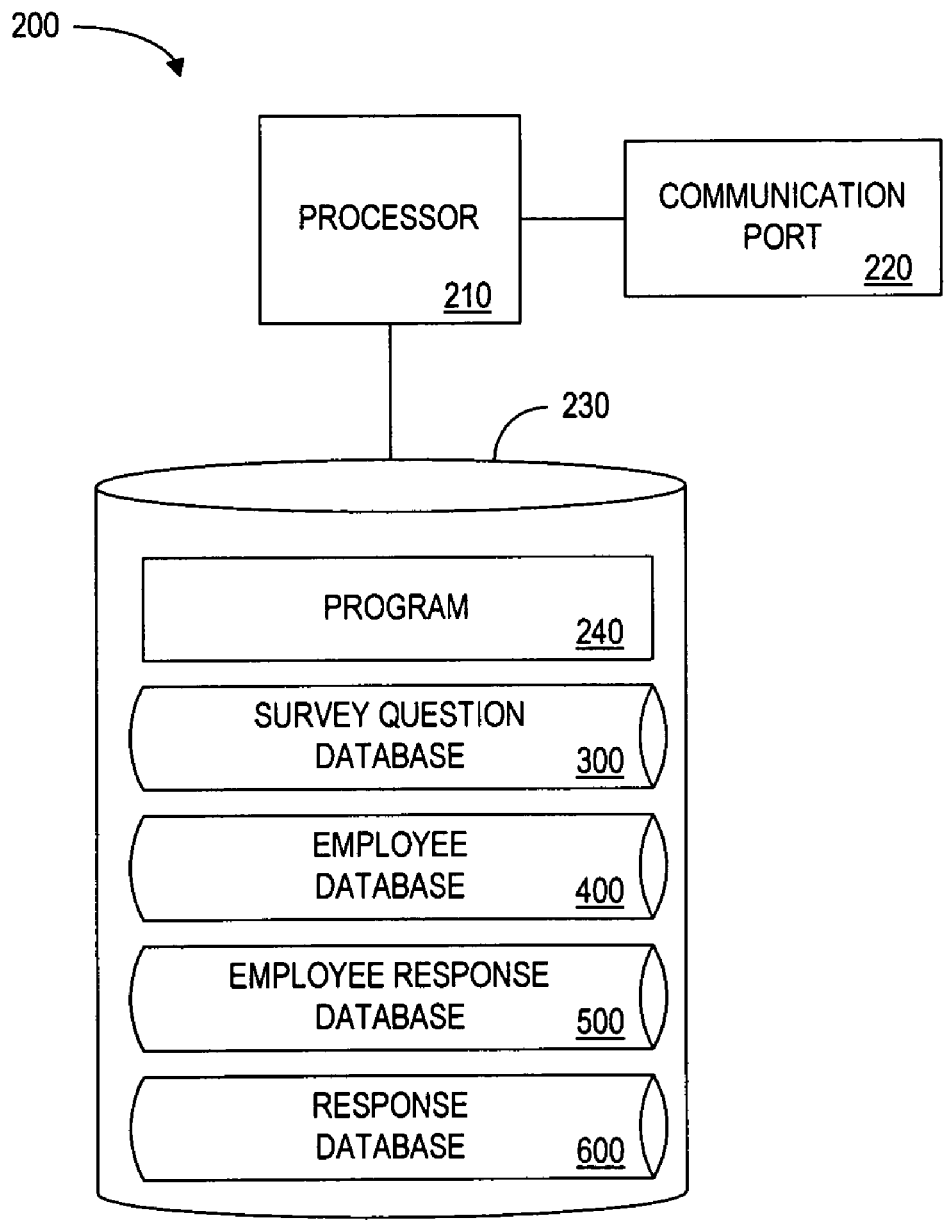
FIG. 2 is a block diagram of one embodiment of the controller depicted in FIG. 1.

FIG. 2 illustrates an embodiment of the controller 200. The controller 200 may be implemented as a system controller, a dedicated hardware circuit, an appropriately programmed general purpose computer, or any other equivalent electronic, mechanical or electro-mechanical device.

The controller 200 comprises a processor 210, such as one or more Intel® Pentium® processors. The processor 210 is in communication with a communication port 220 through which the processor communicates with other devices. The processor 210 is also in communication with a data storage device 230. The data storage device 230 comprises an appropriate combination of magnetic, optical and/or semiconductor memory, and may include, for example, Random Access Memory (RAM), Read-Only Memory (ROM), a compact disc and/or a hard disk. The processor 210 and the storage device 230 may each be, for example (i) located entirely within a single computer or other computing device, or (ii) connected to each other by a remote communication medium, such as a serial port cable, telephone line or radio frequency transceiver. In one embodiment, the controller 200 may comprise one or more computers that are connected to a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format. The program 240 furthermore includes program elements that may be necessary, such as an operating system, a database management system and "device drivers" for allowing the processor 210 to interface with computer peripheral devices. Appropriate program elements are known to those skilled in the art, and need not be described in detail herein.

According to an embodiment of the present invention, the instructions of the program 240 may be read into a main memory from another computer-readable medium, such as from a ROM to RAM. Execution of sequences of the instructions in program 240 causes processor 210 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 230 also stores (i) a survey question database 300, (ii) an employee database 400, (iii) an employee response database 500, and (iv) a response database 600. The databases 300, 400, 500, and 600 are described in detail below and depicted with exemplary entries in the accompanying figures. As will be understood by those skilled in the art, the schematic illustrations and accompanying descriptions of the databases presented herein are exemplary arrangements for stored representations of information. In some embodiments, one or more of the databases are distributed among the terminals 110, 120. Further, some or all of the functionality of the program 240 may be performed at the terminals 110, 120. A number of other arrangements may be employed besides those suggested by the tables shown. Similarly, the illustrated entries of the databases represent exemplary information only, those skilled in the art will understand that the number and content of the entries can be different from those illustrated herein.

Databases

Survey Question Database

FIG. 3 is a tabular representation of the survey question database 300. The tabular representation of the survey question database 300 includes a number of example records or entries each defining a particular survey question that an employee of an entity (such as a retailer or other business) may ask a customer. Those skilled in the art will understand that the survey question database 300 may include any number of entries. The tabular representation of the survey question database 300 also defines fields for each of the entries or records. The fields specify: (i) a question identifier 302, (ii) a question 304, (iii) a number of times asked 306, (iv) a number of responses 308, and (v) conditions 310.

For each entry of the survey question database 300, the data specified by the field 302 identifies a particular survey question that may be asked of a customer. The question identifier 302 may be established by the business, by an entity operating the controller 200, or by the controller 200. The question identifier 302 may be a unique number, code or other identifier suitable for uniquely identifying a specific question. For example, in the database depicted in FIG. 3, each question is identified by a unique alphanumeric identifier such as "Q12345".

For each entry of the survey question database 300, the field 304 includes data representing the question identified by the question identifier 302. The question 304 may be any information representing a specific query that can be posed to a customer. Some questions may be very general in nature and may be used as an introduction to more detailed questions. For example, a general query of "HOW WAS YOUR SHOPPING EXPERIENCE TODAY?" may be used to lead in to a more detailed question such as "HOW LONG DID YOU WAIT IN THE CHECKOUT LINE?" Some of the questions 304 may be tailored based on specific information about a particular transaction. For example, certain questions may be product or manufacturer specific, such as "WERE YOU ABLE TO FIND YOUR (product name) EASILY?", or "HOW OFTEN DO YOU BUY LAUNDRY DETERGENT?" (throughout the specification and drawings, information set off in parentheses in a question is used to signify a variable which depends on a particular transaction, e.g., "(product name)" may be displayed to the employee as "ACME-brand detergent".) Other questions may be customer specific. For example, a customer who is a member of a merchant's frequent shopper program may be identified as such at the point-of-sale, and may be asked "ARE YOU SATISFIED WITH OUR FREQUENT SHOPPER PROGRAM?".

An entity may choose to have its employees recite all questions verbatim. For example, an employee at a terminal may be instructed to read a survey question verbatim from a display monitor. An entity may also choose to give certain employees flexibility in the phrasing of questions. For example, in the survey question database 300 depicted in FIG. 3, the question 304 identified by question identifier Q12354 allows the employee to use his or her own phrasing to address the customer. An employee at a terminal may simply be prompted to ADDRESS (customer) BY NAME AND THANK THEM FOR SHOPPING WITH US. This encourages a more friendly and impromptu interaction with customers. The question 304 may include other instructions to the employee. For example, a question may instruct an employee to perform some action, such as gesturing to a product display, etc. Through the use of customer, transaction, and other information, survey questions according to embodiments of the present invention may be tailored to extract relevant and timely survey responses.

Questions from the survey question database 300 are presented or communicated to an employee via an employee input/output device 112, 122. In one specific embodiment, the question 304 is presented to the employee via a display terminal, and is then orally presented by the employee to a customer, e.g., at a point-of-sale location. Applicants have discovered that customers are more likely to respond to survey questions that are orally presented to them, as opposed to questions which are typewritten on comment cards or which are presented as text on a screen with which the customer interacts. Further, because the question is presented during a transaction, e.g., at a point-of-sale location, or while a customer is browsing through a store, the customer's response to the question is more likely to include timely and relevant information. This ensures that a greater amount of current survey data is received from customers, allowing businesses using embodiments of the present invention to better respond to customer complaints and suggestions. In some embodiments, the question 304 may be a recorded question which is played via an audio output device (customer input/output device 114, 124 of FIG. 1) or otherwise displayed for a customer, e.g., at a point-of-sale location.

For each entry of the survey question database 300, the field 306 includes data identifying the number of times that the question identified by the question identifier 302 has been asked. This information may be used, for example, to determine whether and when a particular question should be asked. The information may also be used to determine whether the question has been asked a statistically-significant number of times. For example, a merchant may test new survey questions by asking the new survey questions at least a certain minimum number of times. If the survey question elicits appropriate responses during the test, the question may be retained. For example, if the question elicits responses that help the merchant improve profitability, the question may be retained. If the survey question does not elicit appropriate responses during the test period, the question's use may be modified or discontinued.

For each entry of the survey question database 300, the field 308 includes data identifying the number of responses which have been received to the question 304 identified by the question identifier 302. Data identifying the number of responses which have been received may be tracked separately from data identifying the number of times a question has been asked because there may be significant differences between the data. For example, customers may refuse to answer certain questions or, in embodiments where customer responses are recorded, there may be microphone problems which prevent customer responses from being recognized.

Tracking the data in separate fields 306 and 308 may help identify any such inconsistencies. Further, the information identifying the number of responses which have been received 308 may also be used, for example, to determine whether a particular question should be asked. The information may also be used to determine whether the question has been answered a statistically-significant number of times. The number of responses 308 may be reset once the number of times asked 306 is reset. In some embodiments, the number of responses 308 and number of times asked 306 may be monitored to improve the quality of questions. For example, if the number of times asked 306 for a particular question is large, but the number of responses 308 is very low, embodiments of the present invention may determine that the question is poorly phrased or not of any value and may discontinue use of the question or mark it for review.

For each entry of the survey question database 300, the field 310 includes data identifying the conditions under which the question 304 identified by the question identifier 302 should be asked. A large number of different conditions may be specified. For example, an introductory survey question which is designed to establish rapport with the customer may be presented to customers with a specified regularity. These introductory questions may be identified as such (e.g., identified with the condition of being "Introductory" in field 310), and may only be presented as initial questions to customers. Further, the question 304 may also have a condition regarding the frequency with which it can be presented. For example, a merchant may wish to ask every tenth customer the introductory question, "HOW WAS YOUR SHOPPING EXPERIENCE TODAY?" For example, the response database 600 (which will be discussed further below) may be referenced to determine if the current customer is the tenth customer.

In some situations, conditions 310 may be satisfied by several different questions 304. Such a "tie" may be broken in several ways. For example, the data in fields 306 and 308 may be used to determine which question to ask where several questions are appropriate. A merchant may determine that the less-frequently asked question should be asked. Other conditions and rules may also be used to choose between multiple suitable questions. For example, a random or semi-random selection between appropriate questions may be made.

In embodiments where more than one question is presented to the same customer, other conditions 310 may specify that a particular question not be presented in conjunction with another question (e.g., where presentation of the two questions together would be redundant, contradictory, or confusing) or that a particular question should be presented in conjunction with another question (e.g., where a follow-up question is appropriate after an initial question). For example, a merchant may determine that the introductory question "IS THERE ANYTHING WE COULD HAVE DONE TO MAKE YOUR SHOPPING EXPERIENCE MORE ENJOYABLE?" should not be presented in conjunction with another broad introductory question such as "HOW WAS YOUR SHOPPING EXPERIENCE TODAY?".

Other types of conditions may be established to ensure that questions are appropriately asked of customers. For example, other conditions 310 may specify that a question is to be presented only if the customer's transaction included a particular product or a product from a particular manufacturer. This allows a business to solicit commentary from customers regarding specific products and manufacturers. As a particular example, a merchant who has established a new product display may wish to ask customers purchasing that product if they were easily able to find the product. As another example, a manufacturer may ask merchants to collect data indicating how frequently certain types of customers buy the manufacturer's product. The merchant may ask customers buying the product "HOW OFTEN DO YOU BUY (product-name)?" and associate that data with demographic data about the customer. In some embodiments, manufacturers or other entities may compensate retailers for asking survey questions about the manufacturer's products. For example, a manufacturer may pay merchants to ask questions which encourage customers to buy particular manufacturer products. A customer who has purchased a large size box of a particular brand of detergent may be asked "WOULD IT BE MORE CONVENIENT FOR YOU IF (product manufacturer) PRODUCED AN EVEN LARGER SIZE OF (product)?". Embodiments of the present invention permit a retailer to solicit, collect, and analyze this information for manufacturers. A particular product or manufacturer may be identified in a transaction based on information scanned in during a purchase transaction (e.g., a product UPC code may be scanned to identify both a product and a manufacturer).

Still other conditions 310 may be used to identify particular customers (e.g., a customer's name may be identified via his frequent shopper account number, credit card number, debit card number, telephone number, or other information). For example, a frequent shopper may be identified at a point-of-sale terminal by scanning a frequent shopper card at a magnetic stripe reader. These various conditions 310 may be combined and used to identify a range of questions to present to customers, from very broad or leading questions, to very specific questions based on transaction details, a customer's purchase history, or previous complaints or suggestions made by the customer.

Those skilled in the art will recognize that various other conditions may be used to identify appropriate questions for particular customers. For example, survey questions may be selected on a random or semi-random basis. Further, conditions may be established to track and monitor the status of particular questions. For example, a merchant may want to continue to ask a particular question until customers no longer express dissatisfaction about the questioned matter. As a specific example, a merchant may continue to ask the question "HOW LONG DID YOU WAIT IN THE CHECKOUT LINE?" until customers no longer complain about long waits in the checkout line (e.g., the question can be repeated until the average of all customer responses to the question indicate a wait time of less than five minutes). Embodiments of the present invention permit a merchant to continue to ask the same question of a repeat customer (or a group of customers) until the customer (or group of customers) is satisfied or until a particular issue is understood and/or resolved.

Merchants may also establish conditions which are based on other factors or data. For example, a merchant may choose to select the number and type of questions based, at least in part, on the time of day, the day of the week, current weather conditions, store location, current or expected sales volumes, current or expected service times, employee experience levels, total store sales, customer traffic, other customer responses received, etc. Trends in each or any of these areas may cause systems according to the present invention to ask particular survey questions and/or to track specific data. For example, a merchant may determine that during peak shopping hours, customers prefer to answer fewer questions than during slow shopping hours. Accordingly, the number of questions asked during peak shopping hours may be limited to no more than two or three.

In other embodiments, merchants may wish to target specific questions to customers when certain trends occur. For example, a merchant may monitor the average checkout time and, if the average checkout time increases past a threshold, survey questions relating to this potential problem may be posed. Similarly, a merchant may determine that questions not be asked during peak traffic times, to avoid delaying check-out time. Merchants may also determine that all customers during a particular period will be asked the same survey question. Those skilled in the art will recognize that other data and fields may be provided to further specify and detail survey questions.

Employee Database

Reference is now made to FIG. 4, which is a tabular representation of the employee database 400. The tabular representation of the database 400 includes a number of example records or entries each establishing information about a particular employee. This information may be used by the system to track whether particular employees are properly presenting questions to customers. The information may also be used to provide compensation to employees who properly present questions to customers or who solicit useful responses from customers. Employees may also be encouraged to develop new survey questions or new and improved phrasing of existing survey questions. Further, in some instances, it may be helpful to follow-up on a particular customer response with the employee who received the response. Those skilled in the art will understand that the employee database 400 may include any number of entries. The tabular representation of the employee database 400 also defines fields for each of the entries or records. The fields specify (i) an employee identifier 402 that uniquely identifies the employee, (ii) an employee name 404, (iii) an employee authority level 406, (iv) employee constructed question(s) 408, and (v) an employee account balance 410.

For each entry of the employee database 400, the data specified by the field 402 is used to uniquely identify specific employees of a business. The employee identifier 402 may be established by the business or by an entity operating controller 200. The employee identifier 402 may be a unique number, code or other identifier suitable for uniquely identifying an employee. For example, an employee's social security number, telephone number, payroll number, or other information may be used as the employee identifier 402.

For each entry of the employee database 400, the data specified by the field 404 is used to identify the name of the employee identified by the employee identifier 402. Other employee information, such as employee contact information, may also be provided in this, or in separate fields.

For each entry of the employee database 400, the data specified by the field 406 is used to specify an employee authority level of the employee identified by the employee identifier 402. For example, a merchant may establish different employee authority levels for its employees, such as "LOW", "MEDIUM", "HIGH", and "MANAGER". Each authority level may have different levels of responsibility and authority. For example, a merchant may determine that only employees who have an authority level of "MANAGER" can provide discounts of greater than 20% in response to customer survey responses. Employees with high authority levels may be given more flexibility in the choice or phrasing of questions. As another example, a merchant may determine that employees who have an authority level of "LOW" cannot ad lib survey questions and must always recite survey questions verbatim. Employee authority levels may also be used track employee performance for compensation purposes.

For each entry of the employee database 400, the data specified by the field 408 is used to identify which survey questions 304 (of survey question database 300), if any, were created by the employee identified by the employee identifier 302. This can be used to compensate employees who develop a widely-used survey question, or who develop many survey questions.

For each entry of the employee database 400, the data specified by the field 410 is used to identify a balance of an employee account established for the employee identified by the employee identifier 402. This account, according to certain embodiments of the present invention, may be used to reward employees for properly presenting questions to customers, for developing useful new survey questions and for effectively remediating complaints or problems. The employee account balance 410 may include a dollar value representing the total value of awards earned by an employee, or the account balance 410 may reflect points, prizes, merchandise, or other awards earned by the employee.

In some embodiments, the employee identifier 402, the employee name 404, the employee authority level 406, the employee constructed question(s) 408, and the employee account balance 410 may refer to a specific terminal 110, 120 rather than a specific employee. For example, in some situations, a retailer may only wish to track performance of a specific point-of-sale terminal. In other situations, the retailer may wish to track performance of the employees at a specific terminal during a specific time period (e.g., during particular shifts). Other data and information may also be provided in the employee database 400.

Employee Response Database

FIG. 5 is a tabular representation of the employee response database 500. The tabular representation of the employee response database 500 includes a number of example records or entries each defining a particular employee response that may be provided to a customer who has responded to a survey question. Those skilled in the art will understand that the employee response database 500 may include any number of entries. The tabular representation of the employee response database 500 also defines fields for each of the entries or records. The fields specify (i) an employee response identifier 502, (ii) a condition(s) 504, and (iii) an employee response 506.

For each entry of the employee response database 500, the data specified by the field 502 includes information identifying a particular employee response. The employee response identifier 502 may be established by the business, by an entity operating the controller 200, or by the controller 200. The employee response identifier 502 may be a unique number, code or other identifier suitable for uniquely identifying a specific employee response. As will be discussed further below in conjunction with a discussion of FIG. 6, the employee response identifier 502 may be used in the response database 600 to identify an employee response to a customer.

For each entry of the employee response database 500, the data specified by the field 504 includes information identifying a condition(s) associated with the employee response associated with the employee response identifier 502. For example, a merchant may establish one or more conditions 504 that must be satisfied by a customer response to trigger a particular employee response. A number of different types of conditions may be established. For example, a merchant may have different employee responses based on the customer's tone (e.g., POSITIVE, NEGATIVE, VERY NEGATIVE, etc.) or the employee's skill level (e.g., TRAINEE, MANAGER, etc.). Other conditions may also be established to ensure that an appropriate response is provided to a customer.

For each entry of the employee response database 500, the data specified by the field 506 includes information identifying an employee response associated with the employee response identifier 502. A number of different types of employee responses may be provided. These employee responses 506 may require a verbatim recitation by the employee, or may allow the employee to ad lib the response (e.g., thank the customer). Other employee responses 506 may require some specific action (e.g., asking a manager to dispatch an employee to fix a problem). As a specific example, if a customer has responded to a survey question in a positive tone and the employee presenting the response is a trainee, then the appropriate employee response 506 is "THANK YOU FOR YOUR INPUT AND FOR SHOPPING AT (store name)".

As another example, a customer who responds with a negative tone, complaining about a particular product, may receive a 50% off coupon for the product if the employee is a MANAGER. In this manner, merchants or other entities may establish specific rules for employees to respond to customers. Customer complaints may be immediately addressed, thereby increasing customer retention and satisfaction. Customer input on surveys may be rewarded or otherwise acknowledged. Those skilled in the art, upon reading this disclosure, will recognize that a number of different types of employee responses and conditions may be established.

Response Database

FIGS. 6A and 6B is a tabular representation of the response database 600. The tabular representation of the response database 600 includes a number of example records or entries, each defining a particular response that an entity (such as a retailer or other business) has received from a customer. Those skilled in the art will understand that the response database 600 may include any number of entries. The tabular representation of the response database 600 also defines fields for each of the entries or records. The fields specify (i) a response identifier 602, (ii) a question identifier 604, (iii) an employee identifier 606, (iv) a customer identifier 607, (v) a response 608, (vi) a category 610, (vii) a tone 612, (viii) a detail(s) 614, and (ix) an employee response 616.

For each entry of the response database 600, the data specified by the field 602 includes information identifying a particular survey question response received. The response identifier 602 may be established by the business, by an entity operating the controller 200, or by the controller 200. The response identifier 602 may be a unique number, code or other identifier suitable for uniquely identifying a specific response.

For each entry of the response database 600, the data specified by the field 604 includes information identifying the question identifier 604 which resulted in the response identified by the response identifier 602. The question identifier 604 is preferably the same as, derived from, or based on the question identifier 302 of FIG. 3. The data specified by the field 606 includes information identifying the employee identifier 606 of the employee who presented the question which resulted in the response identified by the response identifier 602. The employee identifier 606 is preferably the same as, derived from, or based on the employee identifier 402 of FIG. 4. In some embodiments, a terminal identifier may be provided instead of, or in addition to, the employee identifier 606. The terminal identifier and/or employee identifier may be used to associate a specific terminal or employee with one or more responses. This may be useful to a business, for example, to track the performance of particular employees. For example, a merchant may wish to monitor the response rates of employees to determine which employees solicit the most responses. A merchant may also wish to only allow certain employees (e.g., employees with a certain amount of experience, or managers) to ask particular questions or to provide certain responses to customers. For example, a merchant may only allow the store manager to give refunds to customers who have had a bad shopping experience. Embodiments of the present invention allow merchants to control and monitor this type of information.

According to some embodiments of the present invention, the identity of the customer who provided the response identified by response identifier 602 is also tracked. The data specified by field 607 includes information identifying the customer identifier 607 of the customer who provided the response identified by the response identifier 602. The customer identifier 607 may be a frequent shopper account number associated with the customer, the customer's credit card number, debit card number, telephone number, or other information. This information may be used to target survey questions to particular customers or to otherwise identify particular customers (e.g., to credit refunds to the customer, to track complaints made by a particular customer, etc.). Some customers may wish to remain anonymous, in which case the customer identifier 607 is either not used or another identifier is used in its place (e.g., the response identifier 602 may be used to anonymously refer to a particular customer). Merchants may track these anonymous customers separately or may attempt to identify particular anonymous customers by their shopping habits. For example, an anonymous customer who frequently makes unwarranted complaints may be identified and his responses may be filtered to avoid skewing survey results.

For each entry of the response database 600, the data specified by the field 608 includes information identifying the response received to the question identified by the question identifier 604. The response 608 may be a text file produced after processing a customer's spoken response using a speech recognition program, such as the Nuance v.6.0 speech recognition package available from Nuance Communications, of Menlo Park, Calif. In addition, or in the alternative, the response 608 may include a recording of the customer's spoken response. The recording and/or the text file may be edited or modified to remove non-relevant information in a response.

In one embodiment, the customer's spoken response is captured by the employee. For example, the customer may be asked a multiple choice question or a simple "YES/NO" question. The employee, upon hearing the customer's response, may input the response to the terminal 110, 120. For example, the terminal 110, 120 may have a touchscreen or other input device which allows the employee to enter information about the customer's response. In this embodiment, the response 608 may be an indication of the customer's response (e.g., "YES", "NO", etc.). In another embodiment, the employee may be prompted to type or otherwise enter a summary of the customer's response.

In another embodiment, to ensure that responses are properly and accurately captured, only the employee's voice is captured and analyzed. In this embodiment, the employee presents a survey question to a customer, listens to the customer response, and then repeats the customer response. The employee may recite the customer response verbatim or may paraphrase the response. This technique may result in more accurate speech analysis, as the voice recognition system may be trained to each employee's voice. In another embodiment, both the customer response and the employee's recitation of the customer response may be recorded and analyzed. In yet another embodiment, the employee may be prompted by the system to recite the customer response only when the system is unable to recognize a particular customer response.

For each entry of the response database 600, the data specified by the field 610 includes information identifying one or more categories in which the response 608 falls. These categories may be selected from a pre-established list of areas that a merchant has chosen to track. This allows a merchant to utilize the data received from customer responses effectively. For example, a merchant may be especially interested in complaints or suggestions about store layout and staffing, and may establish categories such as "STAFF," "CHECKOUT," and "STORE LAYOUT." Responses may be categorized in any of a number of different ways. For example, embodiments of the present invention may categorize a response 608 by searching for key words or phrases in the response and identifying those categories which are affected by the response. A response may also be categorized by the employee. For example, after a customer provides a response, the employee can key in, or otherwise enter, information into the terminal categorizing the customer's response. Those skilled in the art will recognize that other techniques may be used to categorize customer responses. For example, artificial intelligence, neural network, or data mining techniques may be used to extract useful information from received customer responses.

For each entry of the response database 600, the data specified by the field 612 includes information identifying the general tone or demeanor of the customer who made the response. For example, a business may wish to separately identify and analyze responses which are "NEGATIVE" (e.g., complaints) and responses which are "POSITIVE" (e.g., helpful feedback or praise). Businesses may also wish to identify responses which are "VERY NEGATIVE" so that the complaining customer may be appeased by a discount, or by otherwise quickly addressing the customer's complaint. A customer's tone may be ascertained in a number of different ways. For example, the employee who presents a survey question can input information about the customer's demeanor and tone, the speech recognition program can be used to attempt to identify a customer's demeanor and tone by searching for certain words and phrases which tend to indicate a customer's demeanor and tone. Other techniques known in the art may also be used, for example, techniques may be used to measure the pitch, volume, or other indicators of stress, tone or demeanor which may be discerned from the customer's response.

For each entry of the response database 600, the data specified by the field 614 includes information identifying, where relevant, specific details that have been extracted from the response 608. These details may be extracted using simple word comparison techniques (e.g., all customer responses which include the word "employee" will be classified as a staffing issue), or more complex techniques may be used. These details assist merchants in using and responding to customer input. For example, a merchant may be interested in identifying those responses that identify a specific product or manufacturer. Further, product manufacturers may provide incentives or other benefits to retailers which gather survey data relating to particular products from the manufacturer. As an example, a manufacturer of soap ("BIG Co.") may wish to receive feedback on its products. In particular, the manufacturer may wish to solicit and receive comments about the packaging of "BIG-brand SOAP" by having retailers ask specific product packaging questions of customers who are purchasing (or even customers who are not currently purchasing) "BIG-brand SOAP." Embodiments of the present invention allow product manufacturers and other entities to solicit, receive, categorize and analyze this type of information from a diverse group of retailers. In some embodiments, manufacturers may compensate or otherwise encourage retailers to solicit and collect this information.

For each entry of the response database 600, the data specified by the field 616 includes information identifying the employee response (if required). In one embodiment, the information identifying the employee response is an employee response identifier 502 from the employee response database 500 (FIG. 5). The appropriate employee response is identified by comparing the received customer response with the conditions 504 set forth in the employee response database 500. Employee responses to customer input allows merchants to provide some direct or immediate remediation of a customer complaint or problem or to provide some direct benefit to thank a customer for his comments or input. This remediation may take the form of an employee response 616. For example, using embodiments of the present invention, a business may offer a very disgruntled customer a discount or other incentive to address the customer's complaint or to otherwise appease and retain the customer. A wide number of employee responses 616 may be provided. For example, an employee may simply be prompted to "THANK THE CUSTOMER FOR HIS/HER INPUT." Other employee responses may be more directly related to the tone or content of the customer's response to a survey question. For example, an employee may be prompted to "APOLOGIZE TO THE CUSTOMER" if the customer had a complaint about a long wait in the checkout line. A customer who complained about the store being out of a particular brand of laundry detergent may receive an employee response such as "MR. JONES, WE APOLOGIZE FOR THE INCONVENIENCE. WE VALUE YOU AS A CUSTOMER, SO PLEASE ACCEPT A 15% OFF COUPON FOR YOUR NEXT VISIT." Another employee response may be to dispatch another employee to redress a complaint (e.g., by requesting, over a store public address system, that another employee clean an aisle which has a spill). In other embodiments, the employee response may not be immediate. Instead, the customer response may flagged for further review or remediation. For example, in some embodiments, a follow-up telephone call may be made to the customer. In other embodiments, the employee response may be to mail a coupon or rebate to the customer.

Employee responses 616 may be used to encourage and reward customer behavior as well. For example, a customer who answers a survey question about a particular product may receive a coupon for that product or may receive a discount off the product at the point-of-sale. Those skilled in the art, upon reading this disclosure, will recognize that a wide variety of employee responses may be used in connection with embodiments of the present invention. Direct employee responses are not the only form of remediation which may be performed using embodiments of the present invention. For example, a merchant may continually solicit and collect customer feedback on store layout, but may only change the store layout after receipt of a certain number of specific complaints about the store layout. In this example, there may be no immediate or direct employee response required other than to thank each customer for providing input. Those skilled in the art will recognize that other fields and data may be provided to further track, identify, and analyze responses.

Process Description

Process Overview

A. Fixed Terminal Embodiment

Figure 7:
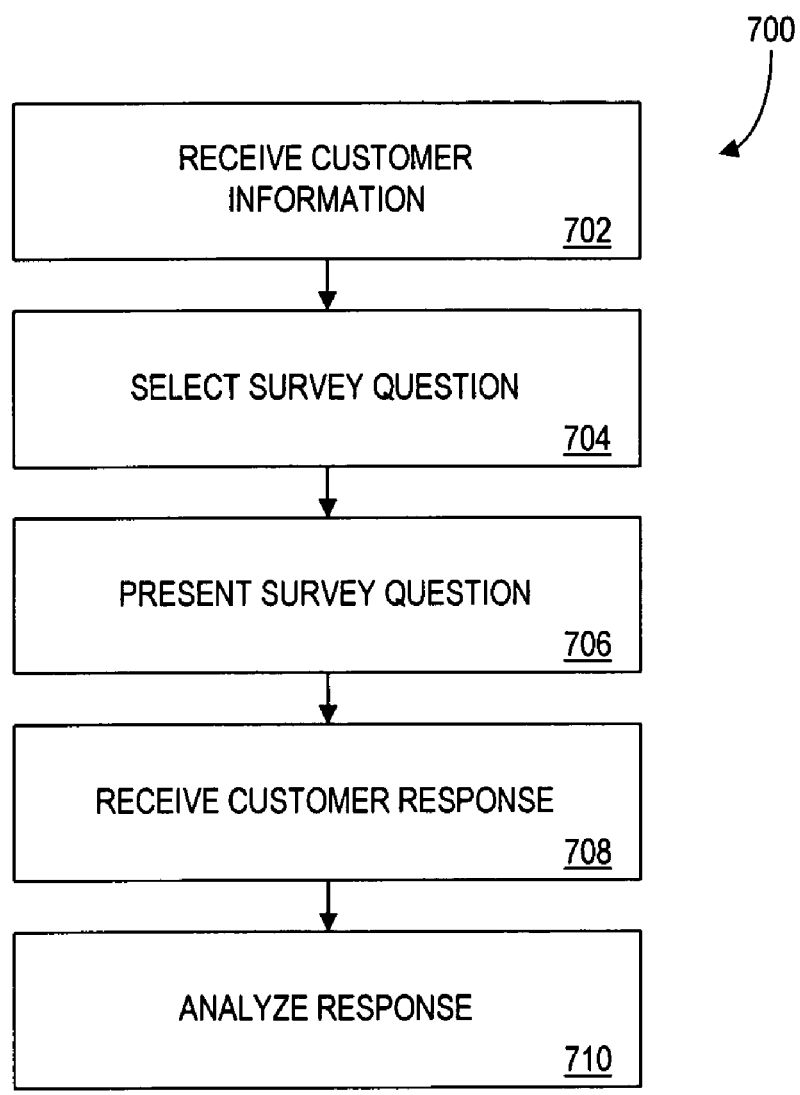
FIG. 7 is a flow diagram illustrating an exemplary process for collecting and categorizing survey data according to an embodiment of the present invention.

Referring now to FIG. 7, a flow chart is shown which depicts a process 700 representing an embodiment of the present invention that may be performed by the controller 200 (FIG. 2). In the first embodiment to be described, the terminal 110, 120 is a point-of-sale terminal, a customer service kiosk, or some other point of purchase or point of transaction device. The particular arrangement of elements in the flow chart of FIG. 7 is not meant to imply a fixed order to the steps. Those skilled in the art will realize, upon reading this disclosure, that embodiments of the present invention can be practiced in any order that is practicable.

A typical process 700 according to embodiments of the present invention begins at 702 with the receipt of customer information. The customer information received at 702 may include transaction information from a purchase transaction received from a point-of-sale terminal; or the customer information may include customer inquiry information received from a customer service terminal. For example, if the customer information received at 702 is from a purchase transaction, the customer information may include information identifying the customer (e.g., the customer's frequent shopper card, credit card number, or some other identifier), information identifying the product(s) purchased (or to be purchased) by the customer in the transaction, and information identifying the employee (e.g., the employee identifier 402 of FIG. 4), etc. This information may be received by the controller 200 from a retail point-of-sale terminal 110, 120. If the customer information received at 702 is from a customer inquiry, the customer information may include information identifying the subject of the customer's inquiry (e.g., a particular product, type of product, or other information), and may also include information identifying the employee (e.g., the employee identifier 402 of FIG. 4). This information may also be received by the controller 200 from a customer service terminal 110, 120.

Some or all of the customer information received at 702 may be stored in the response database 600 (FIGS. 6A and 6B). For example, the employee identifier 606 and customer identifier 607 may be stored in a new record of the response database 600. Other information, such as details regarding a particular product, may also be stored.

Processing continues to 704, where a survey question is selected. A particular survey question may be selected from among a number of survey questions (identified by question identifiers 302) stored in the survey question database 300 (FIG. 3). In one embodiment, a survey question is selected from the survey question database 300 based on a comparison of information from the customer information received at 702 with one or more conditions 310 specified in the survey question database 300 (FIG. 3). For example, if the customer information received at 702 includes information identifying the customer as a frequent shopper card holder, a question may be selected from the survey question database 300 which is appropriate for frequent shoppers. As another example, if the customer information received at 702 includes information identifying a specific product, a question may be selected from the survey question database 300 directed to that particular product. In this manner, relevant survey questions may be selected for each customer based on particular transaction information received at the terminal 110, 120. Further information may be used to select a question 304 from the survey question database 300. For example, several survey questions in the database may be appropriate for frequent shoppers. To select among the suitable questions, other conditions or factors may need to be considered. For example, the question 304 may be selected based on conditions such as the number of times the question has been asked.

In some embodiments, the question 304 may only be an indication of some sort that instructs the employee to ask a question. The indication may simply instruct the employee to ask any question whatsoever, or may instruct the employee to ask a question about a particular topic (e.g., staffing or store layout). The employee may compose his own question, or may at least compose some portion of the question. In other embodiments, the employee may be prompted with a list of one or more types of survey questions to ask a customer, rather than providing the full text of the questions. The employee's phrasing of the question, as well as the customer's response to the question, may both be stored for later analysis. If the employee's phrasing of the question elicited a particularly helpful response, the phrasing may be used as a basis for future survey questions. Further, in some embodiments, the employee may be given great latitude in the type and content of questions asked. Employees may also be compensated for good presentation of questions or for the creation of new questions. This information may be tracked using the employee database 400 (FIG. 4). Those skilled in the art will recognize that a wide variety of types and combinations of survey questions may be presented to customers using techniques of the present invention.

After a survey question is selected, processing continues to 706 where the survey question is presented to the customer. This may be done in a number of different ways. For example, the survey question may be selected by the controller 200 and transmitted to a terminal 110, 120 where it is displayed or otherwise presented via an employee input/output device 112, 122 to an employee operating the terminal 110, 120 (FIG. 1). The survey question may be communicated to the employee in a number of ways. For example, the employee input/output device 112, 122 may include a display monitor and the survey question may be displayed to the employee as text on the monitor. The input/output device 112, 122 may include a headset worn by the employee, and the survey question may be communicated to the employee via the headset worn by the employee. According to one embodiment of the present invention, the employee then orally presents the survey question to the customer. In other embodiments, the survey question may be displayed or otherwise communicated to the customer via the terminal 110, 120, or via the customer input/output device 114, 124.

In one embodiment, once a survey question 304 has been presented to the customer, a field indicating the number of times asked 306 is updated. This information may be used to perform statistical analyses on the question 304 and any responses received. For example, a merchant may determine that responses to a particular question 304 will only be deemed relevant once the question has been asked a statistically-significant number of times.

According to one embodiment, an employee's presentation of the survey question may be recorded by a microphone or other recording device (employee input/output device 112, 122 of FIG. 1). The employee's presentation of the survey question may then be analyzed to determine if the employee properly presented the survey question to the customer. Further, in embodiments where the employee composes his or her own question, the system may track how successful the question is at generating relevant responses. This information may be used to, e.g. determine when and if the question should be asked again, whether another employee should be instructed to ask the question, etc.

Once the survey question has been presented to the customer, processing continues to 708 where the customer's response is received. In one embodiment, the customer's response is received by recording the customer's oral response. A microphone (customer input/output device 114, 124) may be placed in a convenient location near the customer so that the customer's response may be easily, conveniently, and accurately recorded. In some embodiments, the customer input/output device 114, 124 may include video and audio recording devices and both a video and audio recording of the customer's response may be captured. The recording device may be activated by the customer's voice, it may be selectively activated by the employee to record the customer's response, it may include a motion sensor to be activated whenever an individual is near the recording device, or the recording device may always be activated. The employee may also be able to selectively ignore certain customer responses which are, e.g., not responsive to the survey question asked. This may be accomplished, for example, by allowing the employee to selectively disable the customer's microphone.

The response 608 may be stored in recorded format in the response database 600 (FIGS. 6A and 6B), or it may be stored as a character file after processing the customer's response through a voice recognition routine. In one embodiment, once the response has been received, the survey question database 300 is updated to increment the number of responses 308 received for the particular survey question 304 asked (FIG. 3).

Processing then continues to 710 where the response is analyzed. Analysis of a customer response may be performed in a number of different manners. For example, the analysis may involve comparing a response to a number of different rules to categorize the response in one or more pre-defined categories. A merchant, as a specific example, may determine that it is interested in analyzing customer responses for staffing and store layout issues. The merchant may establish categories such as "STAFF," "CHECKOUT," and "LAYOUT." A customer response may then be analyzed by searching for terms in the customer's response which allow the response to be categorized. In some embodiments, where a categorization of a response by keywords is not possible, the customer response may be flagged for further human analysis and categorization. In some embodiments, new categories may be dynamically established by the system and/or by employees.

In some embodiments, the employee and/or the customer may assist in the categorization of customer responses. For example, the program 240 (FIG. 2) may make an initial attempt at categorizing a received customer response and then prompt the employee to confirm the categorization. Alternatively, or in addition, a customer may be prompted to assist in the categorization (e.g., by being asked to confirm the nature of the customer's response, e.g., "YOU WERE DISSATISFIED WITH THE STORE LAYOUT?"). The customer or employee may also be presented with several possible categories for their selection (e.g., "LAYOUT", "STAFFING", "SERVICE", etc.). Other techniques may be used to achieve higher accuracy in the categorization of customer responses. For example, the employee may be prompted to ask a further question to more accurately categorize the customer response.

Analysis of the response at 710 may also involve determining a tone of the customer's response. This may involve a simple categorization of the response as "NEGATIVE" or "POSITIVE" or may include further categorization as "VERY NEGATIVE." This information may be stored in the response database 600 as the tone 612 (FIGS. 6A and 6B). Again, the customer or the employee may be asked to assist in categorizing the tone of the customer's response.

Analysis of the response may also include the extraction of one or more details from the customer's response. For example, a merchant may choose to analyze customer responses for product-specific or product-type details. Product manufacturers may encourage merchants to collect these types of details by paying or otherwise compensating the merchant for the collection of the information. Any details extracted from the customer response are stored in the details field 614 of the response database 600 (FIGS. 6A and 6B).

In some embodiments of the present invention, analysis of the response at 710 may also include a real-time analysis of whether an employee response to the customer is required. For example, to retain customers, a merchant may establish rules which determine whether an employee response is required to a particular customer response. In one embodiment, these rules are set forth in the employee response database 400 (FIG. 4). An employee response 616 may be required, for example, if the tone 612 of a customer response is "NEGATIVE" or "VERY NEGATIVE". In some embodiments, a customer who has been asked a product-specific or manufacturer-specific question may receive a discount or other benefit from the merchant and/or the manufacturer. An employee response 616 may be used to present the customer with the benefit. For example, a customer who was asked the question "HOW OFTEN DO YOU BUY BIG-brand SOAP?" may receive a 50% off coupon or point-of-sale discount in exchange for his response. The employee response 616 be based on the identity of the customer. For example, a different employee response 616 may be provided to a customer who is a frequent shopper than for one who is not a frequent shopper.

The employee response 616 may be provided in real-time (e.g., during a purchase transaction) or the employee response 616 may be provided some period of time after receipt of the customer response (e.g., the employee response 616 may be mailed to the customer after the transaction). If the employee response 616 is provided during the transaction, it may be first communicated to the employee (e.g., via a display screen at a point-of-sale terminal, via a headset, etc.). The employee response 616 may then be communicated to the customer. In one embodiment of the present invention, the employee orally communicates the employee response 616 to the customer. Those skilled in the art, upon reading this disclosure, will recognize that a number of different approaches for analyzing, categorizing, and responding to customer responses may be used with the present invention.

In one embodiment of the present invention, the employee database 400 (FIG. 4) is updated based on an analysis of the response database 600. For example, employees may be rewarded for presenting survey questions properly, accurately, or with good results. This reward may be associated with an employee through the employee database 400 (e.g., the employee account balance 410 may be credited to reward the employee). As employees gain more experience, their authority level 406 may be adjusted accordingly.

Figure 8:
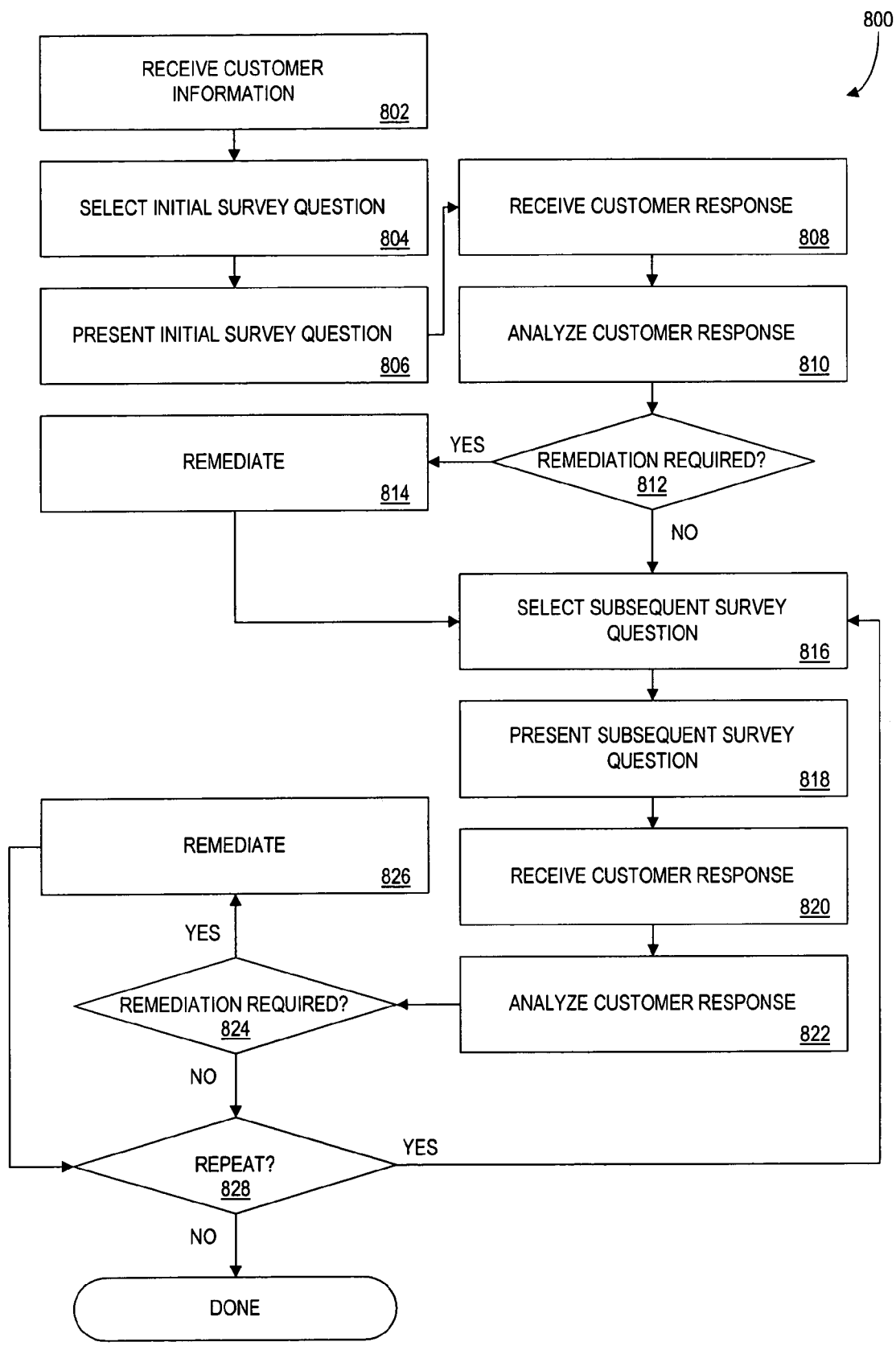
FIG. 8 is a flow diagram illustrating an exemplary process for collecting and categorizing survey data according to an embodiment of the present invention.

Referring now to FIG. 8, a flow chart is shown which depicts a process 800 representing an embodiment of the present invention that may be performed by the controller 200 (FIG. 2). The particular arrangement of elements in the flow chart of FIG. 8 is not meant to imply a fixed order to the steps. In this embodiment, multiple survey questions are presented to a customer using techniques similar to those described in conjunction with FIG. 7.

The embodiment depicted in FIG. 8 commences in a manner similar to the embodiment described in conjunction with FIG. 7, where customer information is received at 802 (the customer information may be, e.g., transaction information from a purchase at a point-of-sale, a customer query at a customer service kiosk, etc.). This customer information is then used, at least in part, to select an initial survey question at 804. In this embodiment, multiple survey questions may be presented to a customer. The initial survey question selected at 704 may be selected to set up or prepare the customer for subsequent survey questions that will be asked. For example, an initial survey question may be a general question designed to establish rapport with a customer such as "HOW ARE YOU TODAY?", or "DID YOU FIND EVERYTHING YOU WERE LOOKING FOR TODAY?". These initial or leading questions may be identified as such in the survey question database 300 (FIG. 3).

The initial survey question is then presented to the customer at 806. In one embodiment, as described above in conjunction with FIG. 7, the survey question may be presented by an employee verbally to the customer. Other methods of presenting the survey question to the customer may also be used as described above.

Processing then continues to 808 where the customer response is received. The customer response may be received in a number of different ways, as described above in conjunction with FIG. 7 (e.g., using a microphone and voice recognition techniques, via employee input, etc.). The customer response is then analyzed at 810 using techniques as described above in conjunction with FIG. 7.

Processing continues to 812 where a determination is made whether any remediation is required. As described above in conjunction with FIG. 7, using techniques of the present invention, a merchant may provide some remediation in direct or indirect response to a customer response. If the merchant determines that some remediation is required, processing continues to 814 where the problem is remediated (e.g., the customer may be given a benefit, a problem may be corrected, the customer may be thanked for her input, etc.).

Processing then continues to 816, where a subsequent survey question is selected. In this embodiment, multiple survey questions are presented to a customer in the course of a single session with a customer. For example, multiple questions may be asked of a customer in the course of a purchase transaction at a point-of-sale terminal, or multiple questions may be asked at a customer service kiosk, or in the course of a survey conducted at a portable terminal in a store. In one embodiment, the selection of the subsequent survey question at 816 is based, at least in part, on analysis of the customer response received at 808. The initial survey question 804 may have been an introductory or leading question asked to establish a dialog with the customer. This introductory question may then be followed by one or more specific questions based on details of the transaction. For example, the subsequent question 816 may be targeted to a customer who has been identified as a participant in the merchant's frequent shopper program, or to a customer who has purchased a particular product or a particular type of product.

As a specific example, if the initial survey question was an introductory question such as "DID YOU FIND EVERYTHING YOU WERE SHOPPING FOR TODAY?" and the customer response received at 808 was "NO, I DID NOT", a follow-up question may be directed to the consumer's inability to find products. For example, the subsequent survey question presented at 818 may be "WHAT WERE YOU LOOKING FOR THAT YOU DID NOT FIND?". Other subsequent survey questions may not necessarily be based on the customer response received at 808, but may instead be questions based on the customer (e.g., following up on previous complaints voiced by the customer, asking about the customer's frequent shopper participation, etc.), the identity of particular products being purchased by the customer, or the like.

The subsequent survey question is then presented at 818. The subsequent survey question may be presented as described in conjunction with FIG. 7 above (e.g., an employee may read the subsequent survey question to the customer). The customer response is then received at 820 in a manner as described above in conjunction with FIG. 7 (e.g., the customer's response may be spoken into a microphone, recorded, and processed using a speech recognition package). The received customer response is then analyzed at 822 in a similar manner as described above in conjunction with FIG. 7. A determination is made whether any further remediation is required at 824 and the remediation is performed at 826.

At 828, a determination is made whether further survey questions should be presented. This determination may be made, for example, based on rules established by the merchant. As a specific example, a merchant may establish a rule that no more than two survey questions will be presented per customer during peak shopping periods. Those skilled in the art will recognize that other rules and procedures may be established to present multiple survey questions. Upon completion of a session with a customer, further analysis may be performed to determine if further remediation is needed.

B. Portable Terminal

In the embodiments described above, the terminal 110, 120 is a point-of-sale terminal (or some other fixed or stationary terminal, such as a terminal at a kiosk). A further embodiment will now be described in which the terminal 110, 120 is a portable terminal such as a PDA or the like. In this embodiment, the terminal 110, 120 is, for example, carried by an employee throughout a store to assist customers and to solicit and collect customer responses to survey questions. The portable terminal referred to in this embodiment may also be used as a point-of-sale device. This embodiment will now be described by referring again to the process 700 of FIG. 7.

In a portable terminal embodiment, as in the point-of-sale terminal embodiment, processing again begins with the receipt of customer information at 702. In this embodiment, however, the customer information may not be information about a purchase transaction. Instead, the customer information may include information about a customer query, request for assistance, or other information. For example, an employee operating a portable terminal may be approached by a customer seeking assistance in finding a particular product or assistance in selecting between products. The customer information, in such an example, may include information about the customer's request. This customer information may be entered into the portable terminal by the employee's operation of an input device or it may be input via a microphone positioned to capture the customer information.

At 704, this customer information is used in the selection of a survey question. For example, a customer inquiring about the location of a product may be provided with the product location information, and then be asked a survey question about the store layout and/or a survey question about the product.

At 706, the selected survey question is presented to the customer. In one embodiment, the selected survey question is displayed on a display device for the employee to relay to the customer. A customer response is received at 708. As with the point-of-sale terminal embodiment discussed above, the customer response may be received by recording the customer's response. The customer response is then analyzed at 710 in a manner similar to that described with the point-of-sale terminal embodiment discussed above.

This portable terminal embodiment allows merchants to solicit and collect customer survey responses during the customer's shopping experience, which results in more accurate and relevant survey data. Further, employees and merchants are able to more quickly and accurately respond to customer complaints and suggestions. Portable terminals may also be used in conjunction with the embodiment described in FIG. 7. For example, techniques of the present invention may be used to enable an employee operating a portable terminal to ask multiple survey questions of customers.

Although the present invention has been described with respect to a preferred embodiment thereof, those skilled in the art will note that various substitutions may be made to those embodiments described herein without departing from the spirit and scope of the present invention.

What is claimed is:

1. A method, comprising:
receiving customer information at a processing device;
identifying an attendant;
identifying a query based at least in part on the customer information and the identity of the attendant;

prompting, in the case that a timing condition associated with a merchant is satisfied, an attendant to present the query;
receiving a verbal response to the query;
analyzing, by the processing device, the verbal response to at least determine a tone of the verbal response; and
categorizing, based on the analysis, the verbal response into at least one pre-established customer response category.

2. The method of claim 1, further comprising:
identifying at least a second query;
outputting an indication of the at least second query; and
receiving a second verbal response.

3. The method of claim 2, further comprising:
analyzing the second verbal response.

4. The method of claim 1, wherein the customer information includes transaction information.

5. The method of claim 4, wherein the transaction information includes information indicating that a purchase transaction is complete.

6. The method of claim 4, wherein the transaction information includes information identifying the start of a purchase transaction.

7. The method of claim 4, wherein the transaction information includes information from a current transaction.

8. The method of claim 4, wherein the identifying of the query is based at least in part on transaction information from a previous transaction.

9. The method of claim 4, wherein the identifying of the query is based at least in part on customer information unrelated to the transaction information.

10. The method of claim 1, wherein the identifying of the query is based at least in part on customer information identifying a particular customer.

11. The method of claim 10, wherein the customer information identifying a particular customer is identified by the attendant.

12. The method of claim 1, in which identifying the attendant comprises at least determining an authority level of the attendant.

13. The method of claim 4, wherein the transaction information includes at least one of: (i) a type of transaction; (ii) an identity of the customer; (iii) a time; (iv) a price; (v) a purchased item; (vi) an environmental condition; (vii) employee information; and (viii) collected survey data.

14. The method of claim 1 further comprising:
identifying a second query based at least in part on the customer response category;
prompting an attendant to present the second query; and
receiving a second verbal response to the second query.

15. The method of claim 14, further comprising:
analyzing the second verbal response to at least determine a tone of the second verbal response.

16. The method of claim 15, further comprising
categorizing, based on the analysis, the second verbal response into at least one pre-established customer response category.

17. The method of claim 1, further comprising:
analyzing, by the processing device, if the attendant properly presented the query.

18. The method of claim 1, wherein receiving customer information is performed using a portable computing device.

19. The method of claim 1, wherein receiving customer information is performed using a point-of-sale processing device.

20. The method of claim 1, wherein receiving a response to the query comprises selectively recording the verbal response.

21. The method of claim 1, further comprising:
determining an offer, the offer determined based at least in part on the verbal response; and
presenting the offer.

22. The method of claim 1, further comprising:
identifying a remediation response based on the customer response category; and
instructing an attendant to present the remediation response.

23. The method of claim 17, further comprising:
compensating the attendant for properly presenting the query, wherein the compensation is different than a standard compensation associated with the attendant.

24. The method of claim 22, further comprising:
analyzing, by the processing device, if the attendant properly presented the remediation response; and
compensating the attendant for properly presenting the remediation response.

25. A method, comprising:
receiving first information at a processing device associated with a merchant;
identifying an attendant;
identifying at least a first query based at least in part on the first information and the identity of the attendant;
determining whether the at least one query satisfies a timing condition associated with the merchant;
prompting, in the case that the at least one query is determined to satisfy the timing condition, the attendant to present the at least first query;
rewarding the attendant in the case that it is determined that the attendant properly presents the at least first query;
receiving a customer response to the at least first query;
analyzing the customer response to at least determine a tone of the customer response; and
categorizing, based on the analysis, the customer response into at least one pre-established customer response category.

26. A medium storing instructions adapted to be executed by a processor to perform a method for conducting a survey, the method comprising:
receiving customer information;
identifying an attendant;
identifying a survey question based at least in part on the customer information and the identity of the attendant;
prompting the attendant to verbally present the survey question to the customer;
determining that the survey question is properly verbally presented by the attendant;
receiving a response to the survey question; and
analyzing the verbal response to at least determine a tone of the verbal response.

27. A method, comprising:
receiving, at a processing device, an indication of a Universal Product Code (UPC) identifying a product;
identifying an attendant;
selecting a query based at least in part on the UPC identifying the product and the identity of the attendant;
prompting the attendant to present the query to the customer;
rewarding the attendant in the case that it is determined that the attendant properly presents the query to the customer;
receiving a verbal response from the customer;

analyzing the verbal response to determine a tone of the response and to determine if a remediation response is required; and instructing, in the case that is determined that the remediation response is required, the attendant to perform the remediation response.

28. The method of claim 1, wherein the timing condition comprises one or more of: (i) a condition based on a time of day; (ii) a condition based on a day of the week; (iii) a condition based on a time of the month; and (iv) a condition based on a time of the year.

29. The method of claim 1, wherein the timing condition comprises a condition based on a current weather condition.

30. The method of claim 1, wherein the timing condition comprises one or more of: (i) a condition based on an expected sales volume of the merchant; (ii) a condition based on an actual sales volume of the merchant; (iii) a condition based on an expected service time at the merchant; (iv) a condition based on an actual service time at the merchant; (v) a condition based on customer traffic at the merchant.

31. The method of claim 1, wherein the identifying of the query is further based at least in part on the timing condition.

32. The method of claim 25, wherein the rewarding comprises:

crediting an amount to an employee account associated with the attendant.

33. The medium of claim 26, wherein the determining that the survey question is properly verbally presented by the attendant comprises:

recording a utterance of the attendant; and analyzing the recording to determined if the utterance indicates that the survey question was properly presented.

34. The method of claim 27, wherein the remediation response comprises one or more of: (i) an expression of thanks; (ii) an apology; (iii) a providing of a benefit; and (iv) a dispatch of assistance.

35. A method, comprising:

receiving, by a processing device, customer information associated with a customer;

identifying an attendant;

selecting, based at least in part on the customer information and the identity of the attendant, a survey question from a plurality of available survey questions;

prompting the attendant to present the survey question to the customer;

recording a verbal response to the survey question;

analyzing, by the processing device, the verbal response to determine a tone of the response; and categorizing, based on the analyzing of the verbal response, the verbal response into at least one pre-established customer response category.

36. The method of claim 35, wherein the survey question comprises one or more of: (i) a question associated with a quality of service experienced by the customer; (ii) a question associated with a shopping experience of the customer; and (iii) a question associated with a physical condition of a store.

37. The method of claim 35, further comprising:

determining, based on the categorizing of the verbal response, a remediation response; and prompting the attendant to perform the remediation response.

38. The method of claim 1, further comprising:

selecting an attendant response based at least in part on the customer response category and the identity of the attendant; and prompting the attendant to present the selected attendant response.

39. The method of claim 1, wherein the at least one pre-established customer response category comprises at least one of a plurality of merchant-defined categories.

40. The method of claim 25, further comprising:

selecting an attendant response based at least in part on the customer response category and the identity of the attendant; and prompting the attendant to present the selected attendant response.

41. The method of claim 25, wherein the at least one pre-established customer response category comprises at least one of a plurality of merchant-defined categories.

42. The medium of claim 26, in which the method to be executed by the processor further comprises:

selecting an attendant response based at least in part on the customer response category and the identity of the attendant; and prompting the attendant to present the selected attendant response.

43. The method of claim 35, further comprising:

selecting an attendant response based at least in part on the customer response category and the identity of the attendant; and prompting the attendant to present the selected attendant response.

44. The method of claim 35, wherein the at least one pre-established customer response category comprises at least one of a plurality of merchant-defined categories.

* * * * *